(12) United States Patent
Rudrapatna

(10) Patent No.: US 7,324,782 B1
(45) Date of Patent: Jan. 29, 2008

(54) LOCATION BASED ADAPTIVE ANTENNA SCHEME FOR WIRELESS DATA APPLICATIONS

(75) Inventor: Ashok N. Rudrapatna, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 777 days.

(21) Appl. No.: 09/638,025

(22) Filed: Aug. 14, 2000

(51) Int. Cl.
*H04B 7/14* (2006.01)

(52) U.S. Cl. ..................... 455/25; 455/404.2
(58) Field of Classification Search ............... 455/562, 455/452, 456, 450, 13.2, 3.02, 3.03, 3.05, 455/429, 430, 422.1, 1, 63.1, 114.2, 277.2, 455/278.1, 25, 63.4, 427, 12.1, 98, 69, 404.2; 342/357.07, 357.08, 357.12, 367, 81, 154, 342/354; 370/335, 334
See application file for complete search history.

(56) References Cited

U.S. PATENT DOCUMENTS

| | | | | |
|---|---|---|---|---|
| 5,025,493 A | * | 6/1991 | Cook, Jr. ................. | 342/374 |
| 5,276,907 A | * | 1/1994 | Meidan .................... | 455/436 |
| 5,606,595 A | | 2/1997 | Ejzak | |
| 5,612,701 A | | 3/1997 | Diekelman | |
| 5,621,752 A | * | 4/1997 | Antonio et al. .......... | 375/144 |
| 5,684,491 A | | 11/1997 | Newman et al. | |
| 5,721,827 A | * | 2/1998 | Logan et al. ............. | 709/217 |
| 5,805,585 A | | 9/1998 | Javitt et al. | |
| 5,815,115 A | * | 9/1998 | Carloni et al. ........... | 342/359 |

(Continued)

FOREIGN PATENT DOCUMENTS

EP 0 869 578 10/1998

(Continued)

OTHER PUBLICATIONS

"Implementation of an Adaptive Antenna Array Using the TMS320C541," Kim Phillips et al, Digital Signal Processing Solutions, Application Report SPRA532, Texas Instruments, Apr. 1999, pp. 2-11 and title page.

(Continued)

*Primary Examiner*—Tu Nguyen

(57) ABSTRACT

A system is provided for adapting and customizing a reverse link beam and a forward link beam that couple a particular mobile unit with a base station for transmitting/receiving data. The forward and reverse links may be dynamically customized for changing data rate requirements, changing position of the mobile unit relative to the base station, and changing SNR. According to one aspect of the invention, a plurality of adaptive antenna elements for the forward and reverse links are located at the base station. In addition to conventional beam forming hardware, the beam forming circuitry of each antenna are coupled to a mobile location detector for detecting the location of a mobile unit with which the base station is communicating. Once the location of the mobile unit has been determined, the beamformer steers a customized narrow, high gain beam toward that mobile unit to form the desired link.

1 Claim, 6 Drawing Sheets

U.S. PATENT DOCUMENTS

| | | | |
|---|---|---|---|
| 5,856,804 A | 1/1999 | Turcotte et al. | |
| 5,889,770 A | 3/1999 | Jokiaho et al. | |
| 5,905,462 A | 5/1999 | Hampel et al. | |
| 6,021,330 A | 2/2000 | Vannucci | |
| 6,246,674 B1* | 6/2001 | Feuerstein et al. | 370/334 |
| 6,349,217 B1* | 2/2002 | Honcharenko et al. | 455/562 |
| 6,353,601 B1* | 3/2002 | Siira | 370/331 |
| 6,473,619 B1* | 10/2002 | Kong et al. | 455/456 |
| 6,697,642 B1* | 2/2004 | Thomas | 455/562.1 |
| 2001/0003443 A1* | 6/2001 | Velazquez et al. | 342/367 |
| 2002/0159506 A1* | 10/2002 | Alamouti et al. | 375/147 |

FOREIGN PATENT DOCUMENTS

| | | |
|---|---|---|
| EP | 0 926 843 | 6/1999 |

OTHER PUBLICATIONS

"Parallel Processing of Adaptive Beamforming Algorithms,," Shonda L. Walker, Capstone Project Proposal, EEL 6935—Parallel Computer Architecture, 3 pp, Feb. 18, 2000.

* cited by examiner

SYSTEM VIEW OF LOCATION BASED ADAPTIVE
ANTENNA SCHEME FOR WIRELESS DATA APPLICATION

TRANSMIT SYSTEM AT A BASE STATION

RECEIVE SYSTEM AT A BASE STATION

TRANSCEIVER SYSTEM AT A BASE STATION

TRANSCEIVER SYSTEM AT A MOBILE UNIT

TRANSCEIVER SYSTEM AT A BASE STATION

LOCATION BASED ADAPTIVE ANTENNA SCHEME FOR WIRELESS DATA APPLICATIONS

BACKGROUND OF THE INVENTION

1. Field of the Invention

The present invention relates to the field of communications. More specifically, it relates to a system and method for improving wireless data transmission by combining an adaptive antenna system with mobile location technology.

2. Description of the Related Art

Wireless data communication with mobile users is typically provided via fixed base stations or cell sites. Wireless data that may be communicated include electronic mail transmissions to and from a mobile unit, downloading a website from a remote Internet server, etc. Each cell site includes one or more antennas arranged for transmission of signals to and from mobile user equipment in the vicinity of the cell site. The signals received from the mobile user equipment may have a relatively low power.

To provide the desired antenna coverage, the area around the cell site may be divided into sectors. Four sectors each of 90 degrees in azimuth coverage, or three 120 degree sectors, thus provide 360 degrees azimuth coverage around a cell site. In some applications, a single sector may be expanded to provide full 360 degree azimuth coverage. The cell configuration reflects the necessity of providing a pattern of adjacent cells, each with its own cell site antenna installation, in order to provide mobile communications coverage over a geographic area or region larger than the limited area covered by a single such installation.

It is relatively straightforward to design an antenna system that provides 120 degree sector coverage. The system may be used to transmit signals to any user within the desired sector coverage area. In general, the power of the received signal for fixed transmitted power is inversely proportional to the width of the beam. If, for example, signals are too weak to reliably reach certain users located at an edge of the coverage area, transmitter power can be increased to a higher level. However, power amplifiers to support higher transmission power are expensive. If the user's transmitted power is inadequate to achieve reliable reception from the outer portions of the sector coverage area, the overall size of the cell and the gain of the receive antenna at the fixed cell site become limiting considerations.

A number of interrelated factors, including expected user population and available channel bandwidths, may also be involved in determining the optimum size of the coverage area of each cell site. It will be apparent, however, that with smaller coverage areas additional cell site installations will be necessary to provide continuous coverage over a geographical region. Additional cell site installations may require the purchase, installation and maintenance of more equipment as well as increased requirements and possibly costs of site acquisition, interconnection facilities and system support. Beam forming techniques to improve performance are well known mitigating techniques.

U.S. Pat. No. 5,612,701 to Diekelman ("the '701 patent") discloses an adaptive beam pointing method in which a satellite provides two types of beams in response to communication demands from mobile units. The first type of beam is an access beam which covers a wide area and is used for coupling a first group of mobile units with the satellite for initiating communication. The second type of beam is a service beam which couples a first group of mobile units, via a beam centered around what is referred to as "the centroid," to the satellite and then couples the satellite to a second group of mobile units via a beam centered around its centroid in an area remote from the first mobile unit once access has been granted via the access beam. The satellite is said to be capable of detecting the location of the mobile units that are requesting a communication link.

The '701 patent does not address certain problems associated with terrestrial systems. Terrestrial communications systems differ significantly from satellite-based communications systems. For instance, the near/far effect with terrestrial systems is of much greater significance than with satellite-based systems. That is, relative to the satellite, located approximately 26,000 miles from earth, all mobile units within a given geographical area are perceived as being substantially equidistant from the satellite. The effects are very different for a terrestrial system in which the respective distance from the base for mobile units may vary greatly. Another phenomenon present with terrestrial systems that is not addressed by the '701 patent is the fact that path losses may be different for the forward link and the reverse link due to propagation environment in the two frequencies e.g., shadowing effects and fast fading. Finally, terrestrial systems are subject to multiple paths unlike satellite systems.

In addition, the '701 patent does not refer to data communications. Data transmission is very different from speech transmission (as addressed in the '701 patent) in several respects. First, the request can come from either the base unit (reverse link) or the mobile unit (forward link), whereas the '701 patent teaches only the reverse link. Second, the forward and reverse links of a data transmission are asymmetrical by their nature. That is, information (e.g., packetized data) transmitted on the forward link might be much more intensive than the information transmitted on the reverse link at any one time and maybe opposite at another time. Third, packet data is inherently bursting (i.e., discontinuous) and the data rate for a particular beam can change instantaneously. That is not the case for speech applications such as the one described by the '701 patent.

Thus, there is a need for a system that allows for the independent control of and the customization of reverse link beams and forward link beams that couple a particular mobile unit with a base station for transmitting/receiving data. Ideally, the forward and reverse link beams would be dynamically customizable for data rate requirements changing with time, the position of the mobile unit relative to the base changing with time, and the SNR changing with time and wherein the customized beam can be steered directly to the mobile unit with which the base station is communicating.

SUMMARY OF THE INVENTION

The present invention provides a system and method for adapting and customizing a reverse link beam and a forward link beam that couple a particular mobile unit with a base station for transmitting/receiving data. The forward and reverse link beams may be dynamically customized for changing data rate requirements, changing position of the mobile unit relative to the base station, and changing SNR.

According to one embodiment of the present invention, a plurality of adaptive antenna elements for the forward and reverse links are located at a base station of a wireless communications system. In addition to conventional beam forming hardware, the beam forming circuitry of each antenna are coupled to a mobile location detection system for detecting the location of a mobile unit (within required precision) with which the base station is communicating.

Once the location of the mobile unit has been determined, the beam former steers a customized narrow, high gain beam toward that mobile unit, thereby forming either a forward link or a reverse link beam, or both forward and reverse independently steered (depending upon whether a data download or a data upload is being performed). As a result, the system and air interface capacity are used only where and when needed in an efficient manner. In addition, interference between users is minimized.

BRIEF DESCRIPTION OF THE DRAWINGS

These and other features and advantages of the invention will become more readily apparent from the following detailed description which is provided in connection with the accompanying drawings in which.

DETAILED DESCRIPTION OF PREFERRED EMBODIMENTS

Preferred embodiments and applications of the invention will now be described with reference to FIGS. 1-6. Other embodiments may be realized and structural or logical changes may be made to the disclosed embodiments without departing from the spirit or scope of the invention.

Figure 1:
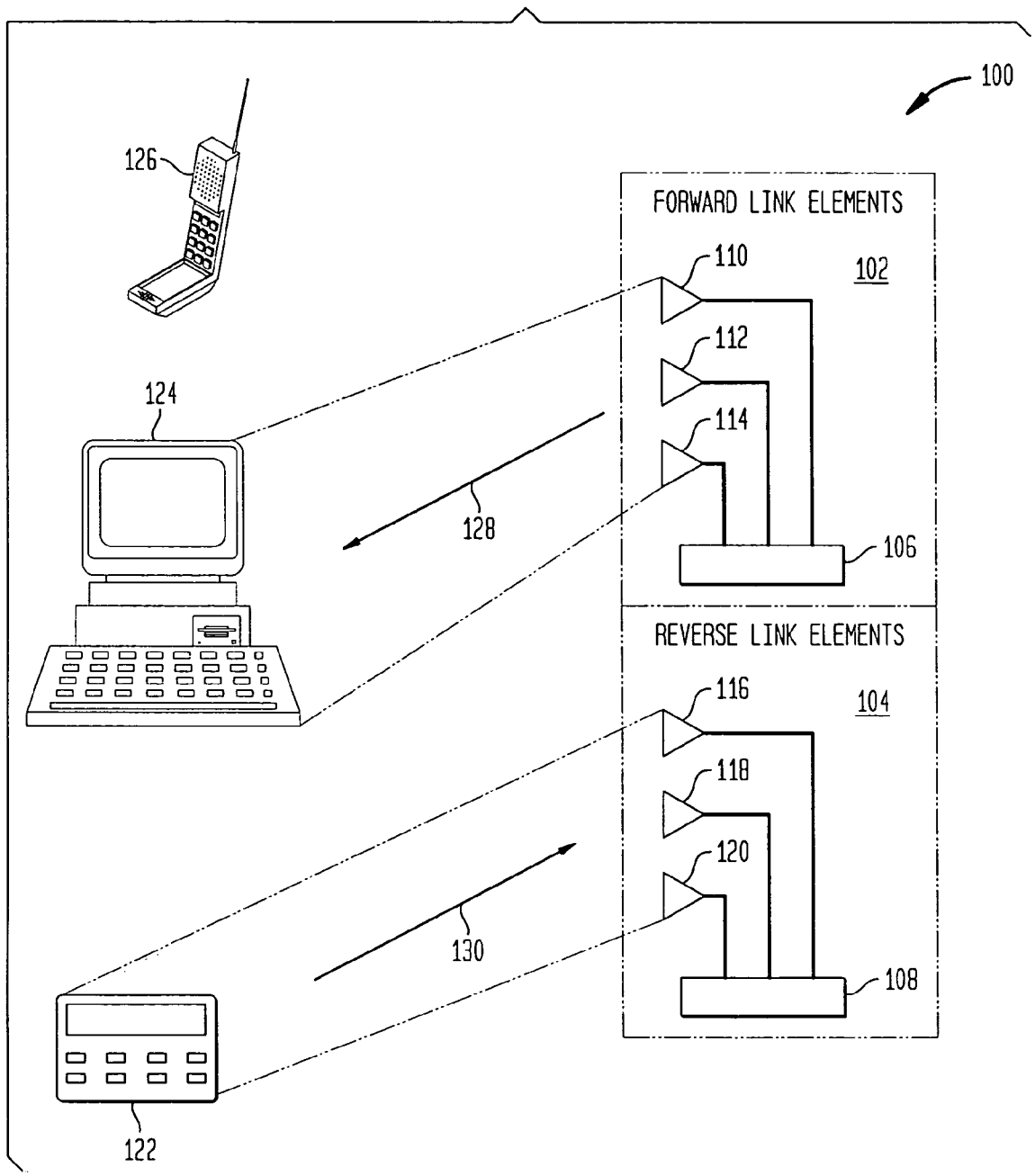
FIG. 1 illustrates a communications system constructed in accordance with a preferred embodiment of the invention.

FIG. 1 illustrates a wireless communications system constructed in accordance with an embodiment of the invention. Base station 100 includes a forward link (i.e., download to a mobile unit) section 102 and a reverse link (i.e., upload from a mobile unit) section 104. Forward link section 102 contains a plurality of adaptive array antenna elements 110, 112, 114. Reverse link section 104 contains additional adaptive array antenna elements 116, 118, 120. The number of antenna elements 110-120 employed in the link sections 102, 104 may depend upon the applicable system parameters (e.g., the geographical area being serviced, number of beam nulls desired, etc.).

The system of FIG. 1 also has a plurality of wireless mobile communication devices 122, 124, 126 that are capable of wireless communication with a base station in a given wireless communications system. For example, a wireless telephonic device 126, a laptop computer 124, and a handheld personal digital assistant (PDA) 122 are depicted. Coupling the laptop computer 124, for example, to antenna elements 110, 112 and 114 of forward link section 102 is a narrow wireless beam 128 formed with forward link hardware 106 as will be discussed more fully below. Coupling the handheld organizer 122, for example, to reverse link antenna elements 116, 118 and 120 is narrow wireless beam 130 formed with reverse link hardware 108 as will be discussed more fully below. Note, by wireless beam, what is meant is that either conventional RF beam or digital beamforming approaches are possible.

Figure 2:
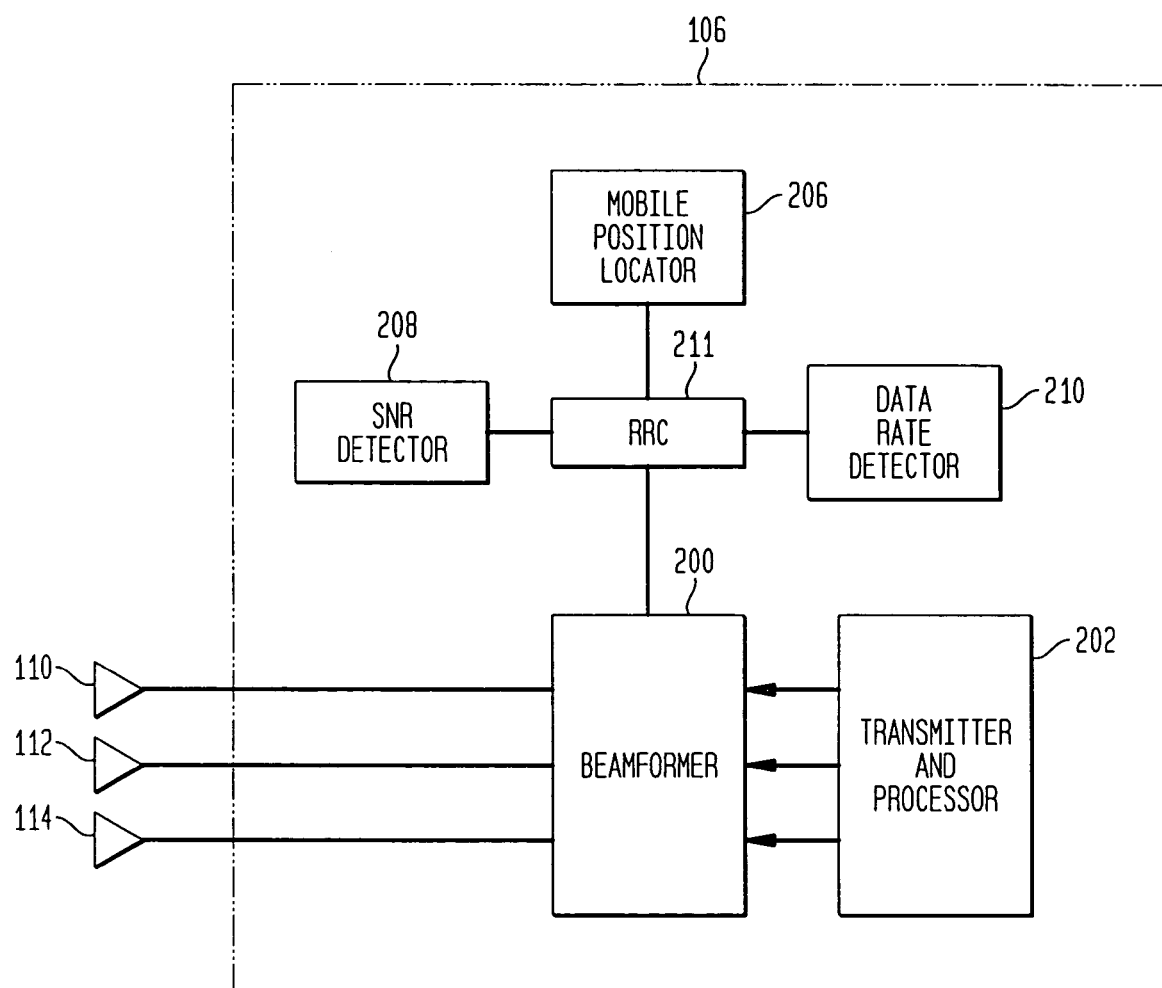
FIG. 2 illustrates forward link hardware for the communications system of FIG. 1.
Figure 6:
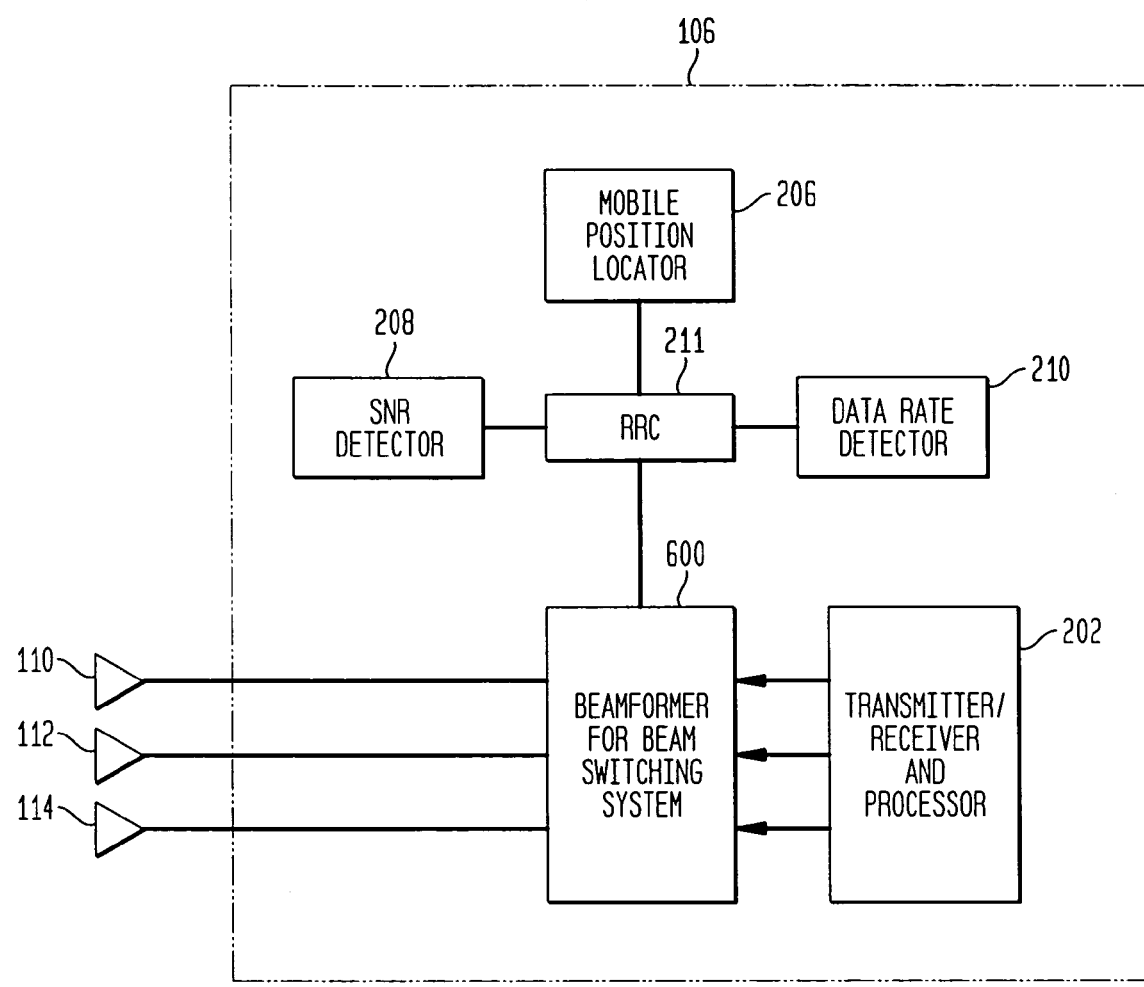
FIG. 6 illustrates transceiver hardware for use in a preferred embodiment of the invention.

As shown in FIG. 2, the three forward link antenna elements 110, 112, 114 are coupled to beamformer 200. Hardware 106 may be configured such that antenna elements 110-114 are configured for an adaptive antenna system. An adaptive antenna system continuously modifies the forward link beams (e.g., 128), i.e., with respect to beam direction, shape, gain, number of beams, etc., with changing conditions through beamformer 200. Alternatively, hardware 106 may be configured such that antenna elements 110-114 are configured for a beam switching system. In a beam switching system, a subset of antenna elements 110-114 are switched on and off by beamformer 200 to form beams under different conditions. A beam switching system is depicted in FIG. 6. The FIG. 6 system is similar to the FIG. 2 system except that it is configured for a beam switching antenna system with its beamformer 600. Referring back to FIG. 2, beamformer 200 processes data received from three units, via radio resource controller (RRC) 211, to form a customized narrow beam for the forward link (e.g., 128 of FIG. 1). One detector that feeds data into beamformer 200 is the mobile position locator 206.

Mobile position locator 206 may be any one of a number of location detection devices and/or systems including but not limited to a global positioning system (GPS)-based detector such as the system disclosed in U.S. patent application Ser. No. 08/927,432 or the system disclosed in U.S. patent application Ser. No. 08/927,434, both of which have the same assignee as the present invention. The entire disclosures of application Ser. Nos. 08/927,432 and 08/927,434 are incorporated herein by reference.

The mobile unit (e.g., 124) position is determined by either the terminal (e.g., 124) or by the mobile position locator 206. Terminal based GPS data is measured at and by the mobile terminal (e.g., 124 of FIG. 1); however, the location data can also be determined by the base station (e.g., 100 of FIG. 1) in what is known as a "network derived" system. Although a a combination of these two may yield accurate results, either technique can be used to practice the invention. The location data is fed into beamformer 200 via RRC 211 for enabling the beamformer 200 to project a narrow beam (e.g., an adaptive array beam) to the particular mobile unit (e.g., 124 of FIG. 1) intended to receive or transmit the data for as long as it may be needed.

Also coupled to RRC 211 is signal-to-noise ratio (SNR) detector 208 for detecting the strength of the signal between the base station 100 and the mobile unit. If a relatively weak signal exists, the SNR detector 208 will send that information to RRC 211, which in turn can send an appropriate signal to the beamformer 200 which will compensate for the low SNR by projecting a beam having a higher gain. The signal may be weak when, for example, the mobile unit is located near the edge of the sector. In general, the more narrow a beam is, the higher the gain of that beam. Therefore, the beam 128 may be customized to compensate for movement of the mobile unit within a sector. The beam 128 may also be customized based on the location of the mobile unit to compensate, for example, for low SNR in certain locations either because of distance or shadow fading.

Still referring to FIG. 2, a data rate detector 210 is also coupled to beamformer 210 via RRC 211. Data rate detector 210 detects the data rate required for downloading particular data from the base station 100 to the mobile unit 124. The data rate may vary with many factors including but not limited to the number and size of packets being downloaded (e.g., a large data file vs. a small data file), the speed with which the data can be retrieved by the base station 100 from an Internet server (not shown), and type of application.

For example, data delivered from a remote Internet server may not be received by the base station within a single contiguous transmission. The data may be received in several packet streams resulting in certain gaps in which data is not transmitted or received. These gaps prevent the forward link 102 from being able to transmit all of the requested data in a single transmission. The base station 100 may transmit a portion of the data and then cease transmission for a period of time followed by another portion of the data, and so on, until all of the data has been transmitted to the mobile unit.

The RRC 211 receives a signal from the data rate detector 210 informing the RRC 211 of the instantaneous and dynamic data rate requirements for transmitting data to the mobile unit 124. In addition, RRC 211 receives location information from the mobile position locator (MPL) 206 and SNR from SNR detector (SNRD) 208. The RRC 211 receives all this information (data rate, SNR, location) along with other information such as Quality of Service needs (delays, error, etc.) from each user. The RRC 211 computes the best way to allocate the radio resources. Radio resources allocation may include beam pointing, amount of power, beam width, duration, etc., for each beam. This information is then conveyed to the beamformer 200. The beamformer 200 in turn constantly modifies the narrow beam 128 to accommodate the always-changing radio resource allocation instructions it receives from the RRC 211 (inherent with wireless data transmissions). An output of transmitter 202 is coupled to an input of beamformer 200 for producing the transmitted beam 128 (FIG. 1).

Figure 3:
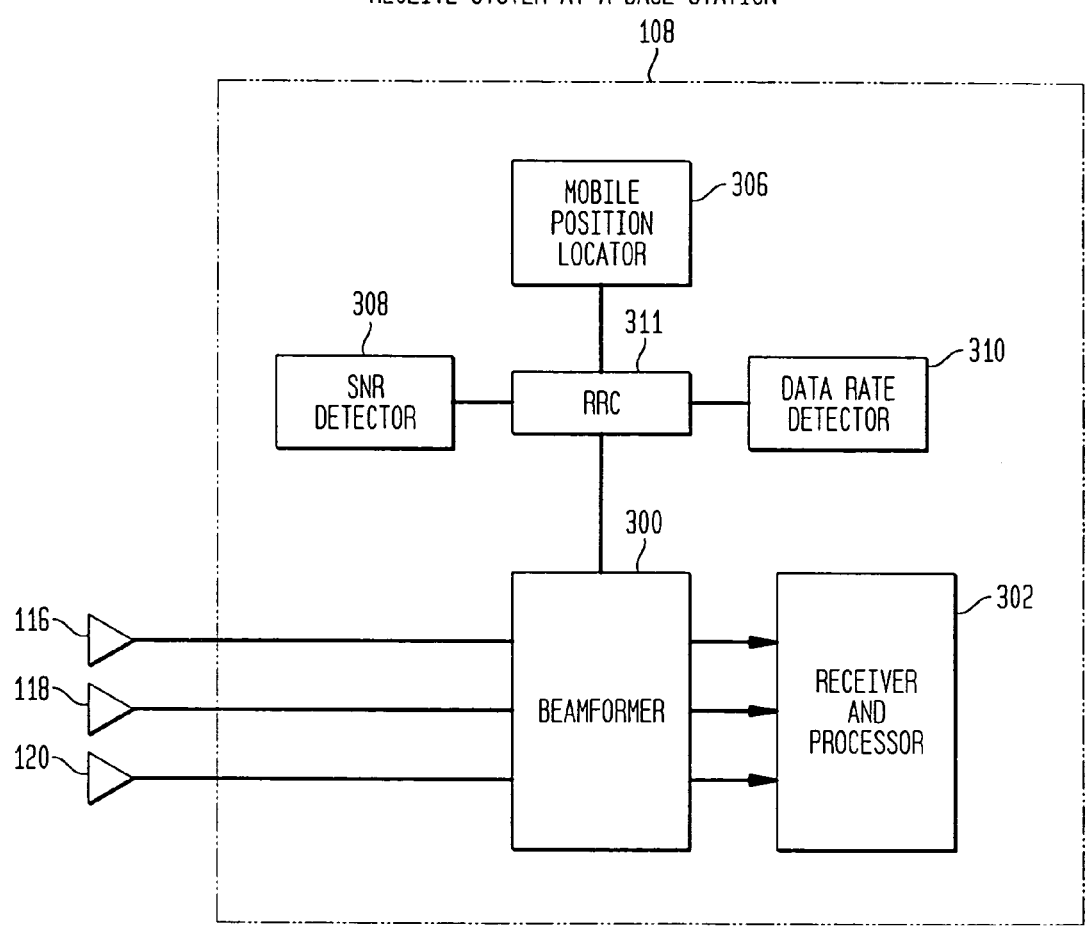
FIG. 3 illustrates reverse link hardware for the communications system of FIG. 1.

The reverse link hardware 106 of the FIG. 1 system is depicted in FIG. 3. Each of the three antenna elements 116, 118, 120 are coupled to beamformer 300. Beamformer 300 receives instructions from RRC 311 in forming a customized narrow beam for the reverse link 130. RRC 311 processes data received from at least three units 306, 308, 310 in determining the beam structure and duration for each beam. These three units are coupled to beamformer 300 via RRC 311 in a manner similar to that of the beamformer 200 of FIG. 2. The mobile location detector 306, SNR detector 308 and data rate detector 310 of FIG. 3 operate in a manner similar to the detectors 206, 208, 210 shown in FIG. 2.

Also coupled to beamformer 300 is receiver and processor 302 for receiving and processing data from the mobile unit 122 on the reverse link. Receiver and processor 302 may be an adaptive array processor, a switched beam array processor or another suitable wireless signal processor. Coupled to an output of receiver and processor 302 may be additional receiver processing circuitry as needed in a particular system. The particular configuration of such circuitry may vary from one system to another and also with service providers.

Figure 4:
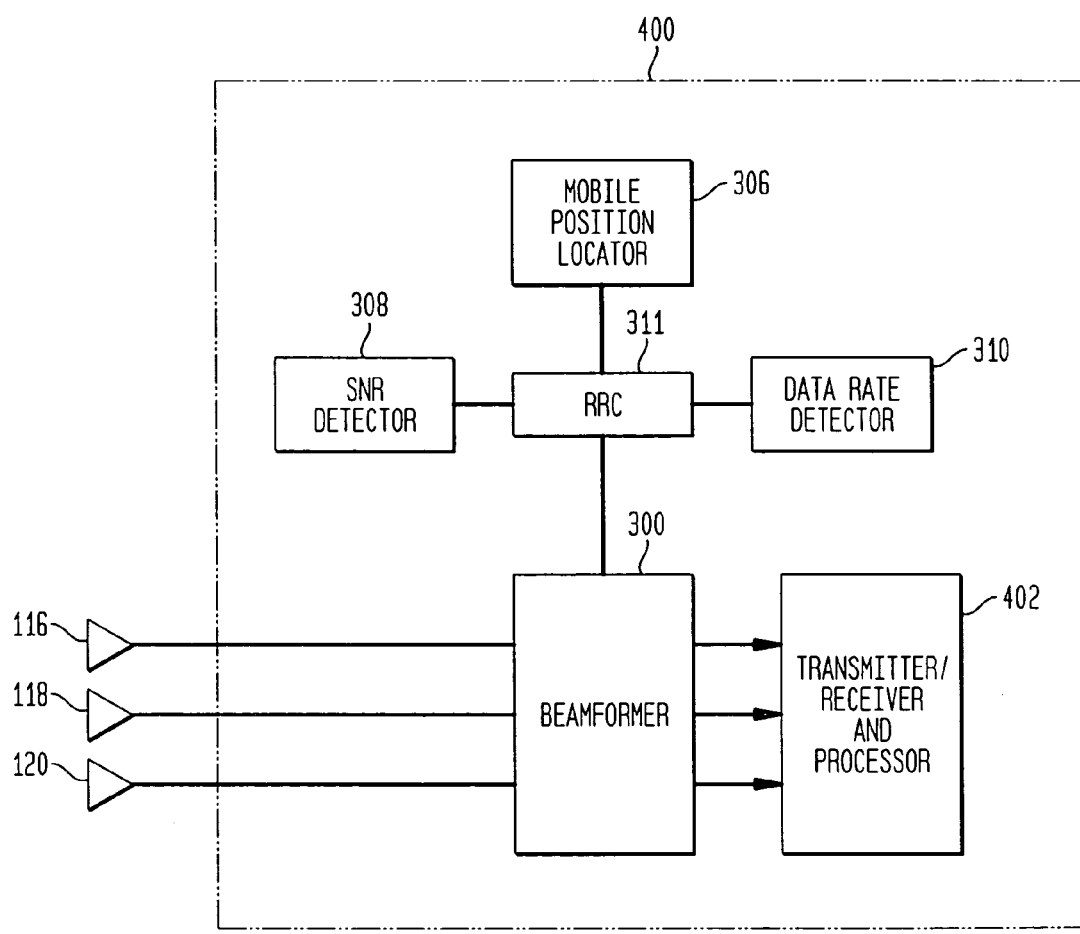
FIG. 4 illustrates combined forward/reverse link hardware for the base station system of FIG. 1.

FIG. 4 depicts an alternative embodiment of the invention in which the FIG. 2 and FIG. 3 wireless communications systems are combined within a single unit. That is, the forward link hardware 106 and the reverse link hardware 108 may be combined within forward/reverse link hardware 400 of FIG. 4. The components of the FIG. 4 system are similar to those of the FIG. 3 system except that the FIG. 4 system includes a transceiver 402 capable of transmitting and receiving narrow, high gain beams coupling the base station 100 with a mobile unit (e.g., 122 of FIG. 1).

Figure 5:
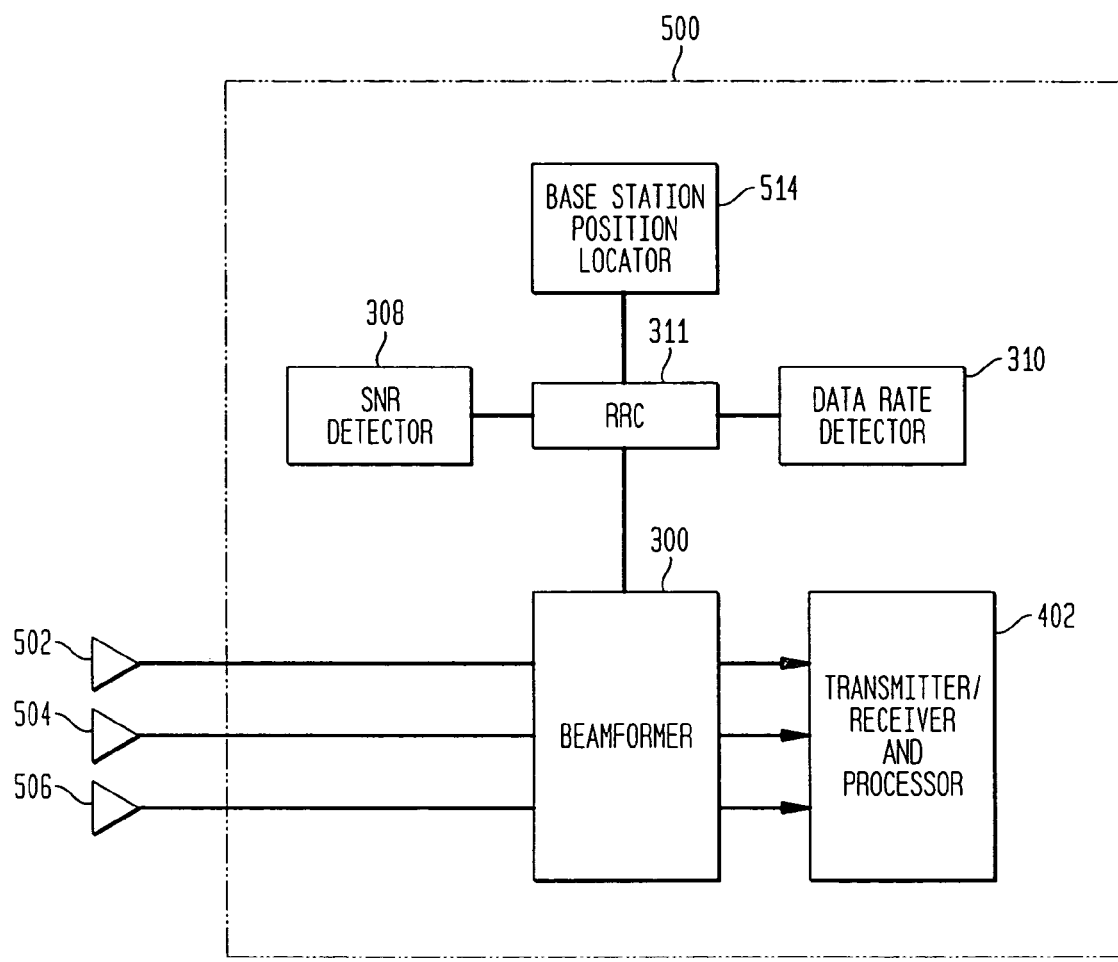
FIG. 5 illustrates a mobile communications unit constructed in accordance with a preferred embodiment of the invention.

FIG. 5 depicts a third embodiment of the invention in which a transceiver system is located within a mobile unit 500. Mobile unit 500 may be any one of the communications units 122, 124, 126 or other mobile units capable of wireless communication with a base station. The mobile unit 500 contains antenna elements 502, 504, 506 through which narrow, high gain adaptive or switched beams may be transmitted and received. Antenna elements 502, 504, 506 are coupled to hardware that is similar to the hardware described above in connection with FIG. 4 except that mobile position locator 306 is replaced with base station position locator 514 for locating a position of the base station 100.

The present invention provides an improved data communications system that can be used for both the forward link and the reverse link. In general, for data communications applications, it is expected that downloads (i.e., forward links) may be more intensive than uploads (i.e., reverse links). This is because the reverse link usually carries a request for data while the forward link usually contains the data itself. Other applications may be different, e.g., intensive in the reverse link (e.g., file upload) or symmetrical. The procedures and inventions described herein address all of these needs as well. The present invention provides a beamformer 200 that is capable of adapting and customizing the narrow beam in several respects including gain level, beam width, and beam direction in response to inputs into the beamformer 200 received from one of at least three detecting devices 206, 208, 210.

Therefore, in general, a beam used for the forward link will be different (e.g., in shape, orientation and gain) than a beam used for the reverse link. The present invention also provides means for instantaneously compensating for losses in SNR, differing data rates and movement of the mobile units such that both the forward link and reverse link beams may be customized and also steered via the beamformer. In the preferred embodiments, the beamformer constantly receives location information for a particular mobile unit. The present invention should not be limited, however, to the preferred embodiments shown and described in detail herein.

It should be apparent that many modifications can be made to the invention without departing from its spirit or scope. For example, although the antenna elements (110-120) are depicted as being located in only the base station, the mobile units may also be configured to contain such antennas for projecting narrow, high gain beams toward the base station of a particular sector. In addition, the invention may be carried out with many other different hardware configurations and/or hardware/software configurations without departing from the spirit and scope of the invention. Accordingly, the invention is not limited by the foregoing description or drawings, but is only limited by the scope of the appended claims.

The invention claimed is:

1. A method of communicating comprising:
    modifying at least one antenna's beam width based on received radio resource allocation instructions for signals to be transmitted and/or received by the at least one antenna, the instructions including location information of a mobile in communication with the at least one antenna;
    where the radio resource allocation instructions comprise information related to data rate of the signals, a signal to noise ratio of the signals, power level of the signals and quality of service needs of a user of the mobile.

* * * * *